(12) United States Patent
Igarashi et al.

(10) Patent No.: US 6,182,639 B1
(45) Date of Patent: *Feb. 6, 2001

(54) THERMAL-TYPE AIRFLOW METER, INTAKE AIR SYSTEM FOR AN INTERNAL COMBUSTION ENGINE, AND CONTROL SYSTEM FOR THE SAME

(75) Inventors: Shinya Igarashi, Naka-machi; Akira Takasago; Masayuki Kozawa, both of Hitachinaka; Kaoru Uchiyama, Oomiya-machi; Mitsukuni Tsutsui, Naka-machi, all of (JP)

(73) Assignees: Hitachi, Ltd., Tokyo; Hitachi Car Engineering Co., Ltd., Hitachinaka, both of (JP)

( * ) Notice: Under 35 U.S.C. 154(b), the term of this patent shall be extended for 0 days.

This patent is subject to a terminal disclaimer.

(21) Appl. No.: 09/475,276

(22) Filed: Dec. 30, 1999

Related U.S. Application Data (63) Continuation of application No. 09/105,050, filed on Jun. 26, 1998, now Pat. No. 6,012,432.

(30) Foreign Application Priority Data

Jun. 26, 1997 (JP) .................................................. 9-170630

(51) Int. Cl.⁷ .............................. G01F 1/68; F02M 69/48
(52) U.S. Cl. ...................... 123/494; 73/204.22; 73/118.2
(58) Field of Search ............................... 123/494, 198 E; 73/204.22, 118.2, 204.11

(56) References Cited

U.S. PATENT DOCUMENTS

| | | | |
|---|---|---|---|
| 4,887,577 | * 12/1989 | Arai et al. | 123/494 |
| 4,991,860 | * 2/1991 | Arai et al. | 123/494 |
| 5,186,044 | * 2/1993 | Igarashi et al. | 73/118.2 |
| 5,537,870 | * 7/1996 | Zurek et al. | 73/202 |
| 5,672,822 | * 9/1997 | Sawada et al. | 73/202.5 |
| 5,696,321 | * 12/1997 | Igarashi et al. | 73/202.5 |
| 5,756,893 | * 5/1998 | Kondo et al. | 73/204.22 |
| 5,789,673 | * 8/1998 | Igarashi et al. | 73/202.5 |

FOREIGN PATENT DOCUMENTS 9-170630  10/1997  (JP) .

* cited by examiner

*Primary Examiner*—Henry C. Yuen
*Assistant Examiner*—Arnold Castro
(74) *Attorney, Agent, or Firm*—Evenson, McKeown, Edwards & Lenahan, P.L.L.C.

(57) ABSTRACT

A thermal-type airflow meter comprises an airflow meter body and a measuring part. Both of the frame of a housing which accommodates the electronic circuit, and a sub-passage member which has the heating resistor positioned within a sub-passage, are arranged on a metallic base. Further, the frame, the sub-passage member, the metallic base and the cover are each fixedly attached to at least two respective different members. A connector of the housing, the frame and the sub-passage member are formed in a flat shape to form the measuring module. The measuring module is inserted through an insertion hole to locate the heating resistor within the main air passage, and the fixing flange of the housing is fixedly attached to the airflow meter body.

17 Claims, 5 Drawing Sheets

THERMAL-TYPE AIRFLOW METER, INTAKE AIR SYSTEM FOR AN INTERNAL COMBUSTION ENGINE, AND CONTROL SYSTEM FOR THE SAME

This application is a continuation of application Ser. No. 09/105,050, filed Jun. 26, 1998, now U.S. Pat. No. 6,012,432.

BACKGROUND OF THE INVENTION

1. Field of the Invention

The present invention relates to a thermal-type airflow meter suitable for measuring the flow rate of air taken into an internal combustion engine, and more particularly to a thermal-type airflow meter, which comprises a housing for protectingly accommodating an electronic circuit therein and a sub-air passage.

2. Description of the Related Art

JP-A 3-233168 discloses an example of prior art thermal-type airflow meters. In this prior art, a housing part for protecting an electronic circuit therein and a sub-air passage part are arranged in the same plane to be made one body. Further, there is also proposed an airflow meter, in which a housing and a sub-air passage are plastic-molded as a unitary body.

However, the prior art as mentioned above needs to be improved in the following respects:

(1) A member in which a housing and a sub-air passage are formed should be suitably shaped for assembly by means of insertion technology (that is, should have proper dimensions to match an inserting hole);

(2) The relative positioning of a housing and a sub-air passage should never vary. That is, after the sub-air passage has been fixedly attached to a member in which a main air passage is formed, the attached position of the subair passage should never vary;

(3) The deformation of an airflow meter due to the environmental operating conditions as small as possible, and the durability and reliability thereof should be sufficient; and (4) There should be freedom in designing the shape of a sub-air passage, and further even if it has the complicated shape, it can be easily manufactured.

SUMMARY OF THE INVENTION

An object of the present invention is to provide a thermal-type airflow meter which can measure the flow rate of air with high accuracy and has excellent durability and reliability against the operating environment. Further, the present invention provides an intake air system for an internal combustion engine and a control system therefor, which is high in its control ability and reliability.

A thermal-type airflow meter according to a feature of the present invention has a sub-air passage which accommodates a flow rate measuring part including a heating resistor, and a housing which is arranged next to the sub-air passage, and which accommodates therein an electronic control unit for controlling the heating of the flow rate measuring part. The sub-air passage and the housing are plastic-molded separately, then fixedly attached to each other and put on a flat metallic base member which is mechanically strong in its longitudinal direction. The sub-air passage and the housing are fixed on the metallic base member.

Preferably, adhesion among the sub-air passage, the housing and the metallic base member is provided via a face which belongs in common to two of the aforesaid members that come into contact with each other.

According to another feature of the present invention, a thermal-type airflow meter has a sub-air passage with at least one bent portion, through which flows a part of the air in a main air passage that functions as an intake air passage of an internal combustion engine. A heating resistor arranged within the sub-air passage and an electronic circuit electrically connected to the heating resistor produce a signal indicative of an air flow rate, based on the heat radiated by the heating resistor. A housing which accommodates and protects electronic circuit is composed of a frame part surrounding the electronic circuit, a connector part with connector terminals for electrically connecting the electronic circuit with external devices, and fixing mounts for fixedly supporting the heating resistor on the opposite side to the connector part with respect to the frame part. All of the latter parts are plastic-molded as one body, as is a member for forming the sub-air passage. At least the frame part of the housing and the sub-air passage member are formed in a flat shape and fixedly arranged on a flat metallic base member in the longitudinal direction thereof, so as to locate the heating resistor in the sub-air passage.

According further to another feature of the present invention, a housing which accommodates and protects the electronic circuit comprises a frame part surrounding the electronic circuit, a connector part with connector terminals for electrically connecting the electronic circuit with external devices, and fixing mounts for fixedly supporting the heating resistor on the opposite side to the connector part with respect to the frame part. All of these parts are plastic-molded as one body, as is a member for forming the sub-air passage. At least the frame part of the housing and the sub-air passage member are formed in a flat shape and fixedly arranged on a flat metallic base member in the longitudinal direction thereof. A cover is provided for covering an opposite side of the metallic base member to the frame part, which cover is fixed both to the housing and the sub-air passage member, so that the frame part is covered by the metallic base member on one side and by the cover on the opposite side, thereby forming a closed compartment for accommodating therein the electronic circuit.

The thermal-type airflow meter according to the present invention can be attached to a part of a body of an air cleaner. Further, an intake air system for a combustion engine performs the fuel control using such an airflow meter.

According to the present invention, since the housing and the sub-air passage member are separately plastic-molded, the longitudinal dimension of both can be shortened, so that the initial dimensional change of those members during molding can be suppressed. The housing and the sub-air passage adhere to each other, and both are fixedly mounted on a mechanically strong metallic base member to suppress the dimensional change during assembling and aging.

In this manner, dimensional accuracy can be secured and the influence of the dimensional change on the measuring accuracy can be reduced, so that accurate measurement of the air flow rate can be achieved. Further, each member is fixed to more than one other member. (That is, it is held to at least two members which are separate from each other.) Accordingly, the incidence of separation or removal of two members is significantly reduced, with the result that the durability and reliability of the airflow meter is much improved.

Other objects, advantages and novel features of the present invention will become apparent from the following detailed description of the invention when considered in conjunction with the accompanying drawings.

DETAILED DESCRIPTION OF THE EMBODIMENTS

In the following, description will be made of embodiments of the present invention, referring to the accompanying drawings.

Figure 1:
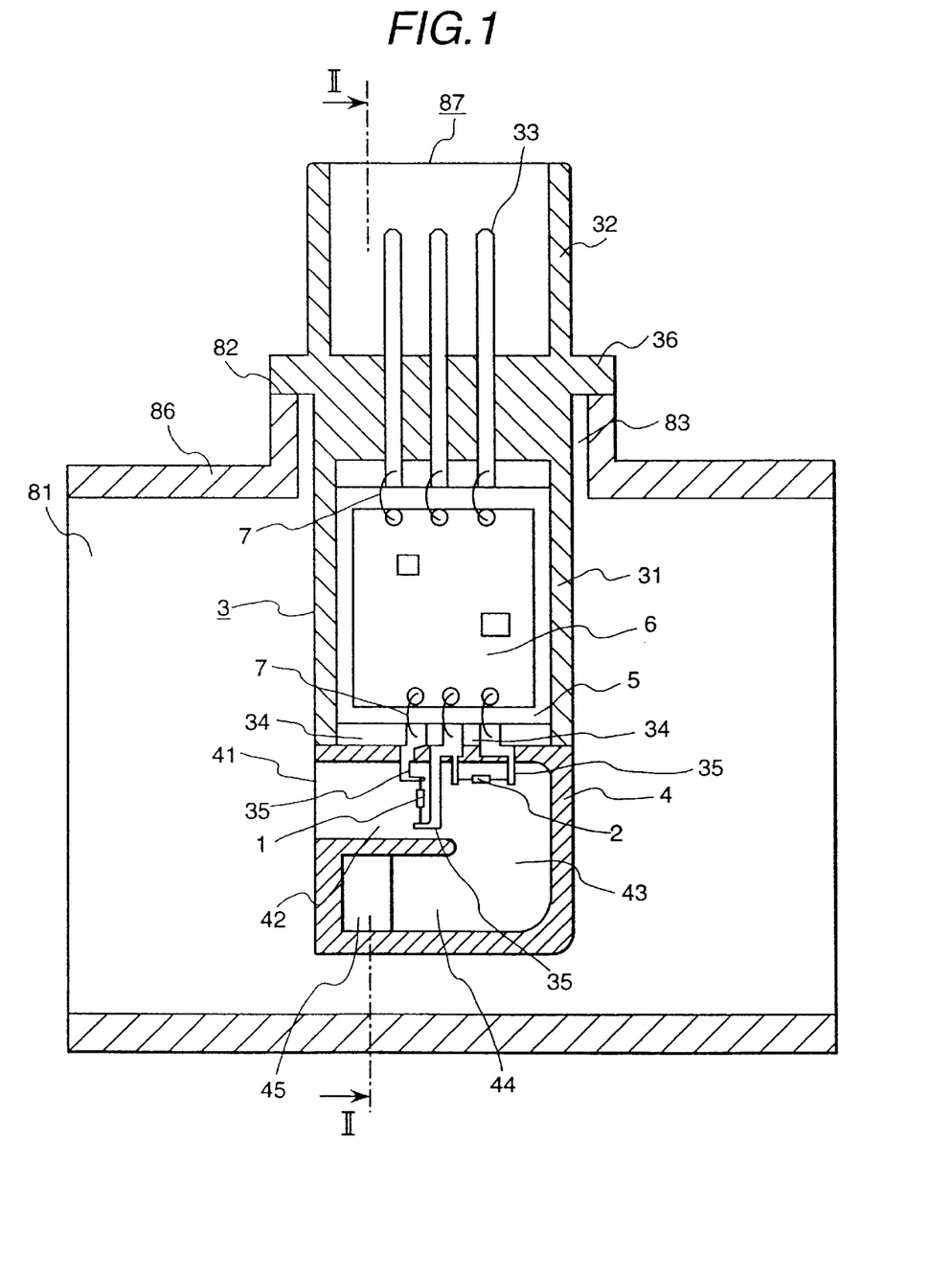
FIG. 1 schematically shows a sectional view of a thermal-type airflow meter according to an embodiment of the present invention.
Figure 2:
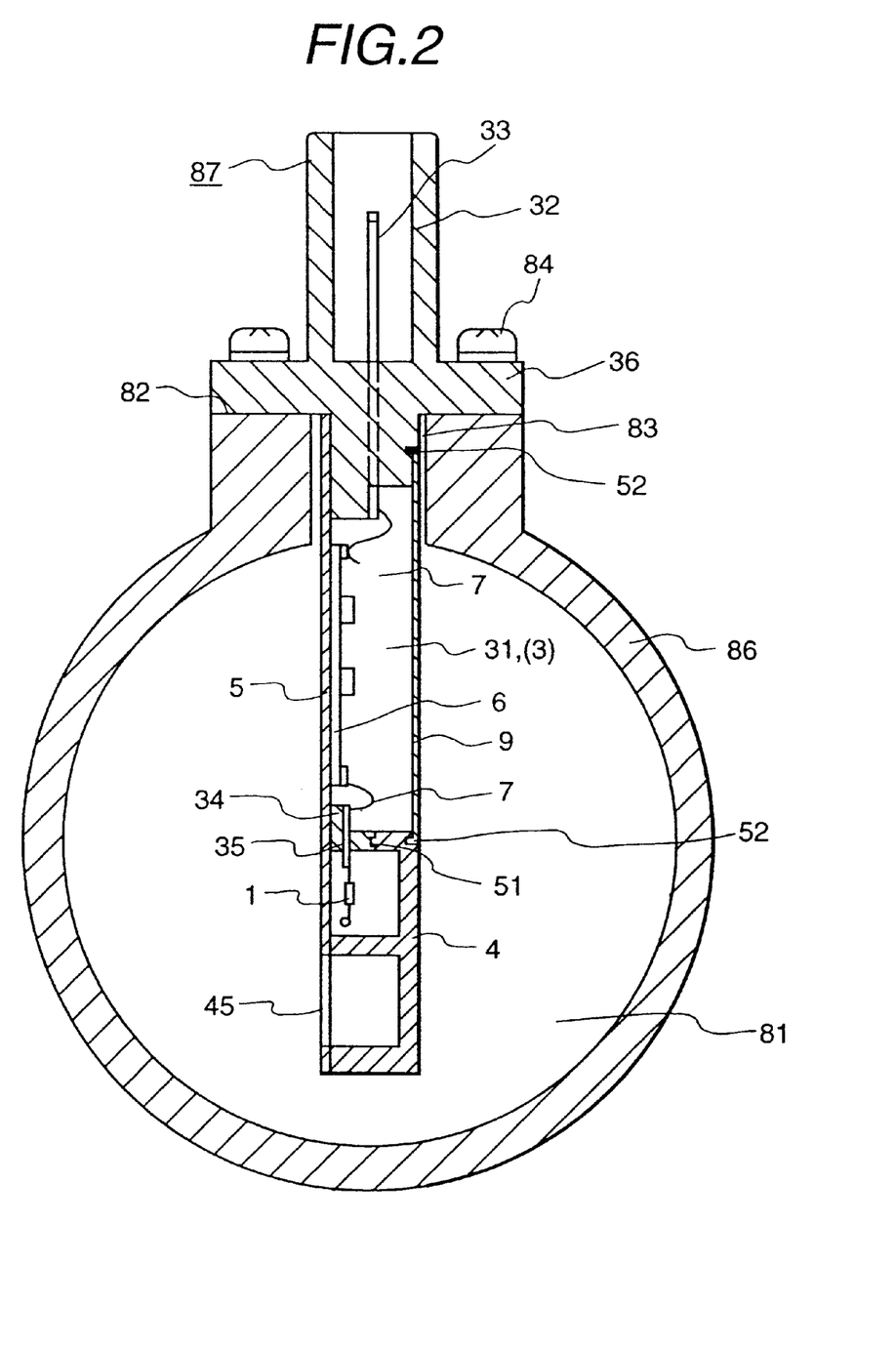
FIG. 2 shows a cross section of the airflow meter, as shown in FIG. 1, along the line II—II.

Referring at first to FIGS. 1 and 2, a thermal-type airflow meter according to a first embodiment of the present invention will be described, wherein FIG. 1 schematically shows the sectional view of the airflow meter and FIG. 2 shows the cross section of the airflow meter, as shown in FIG. 1, along the line II—II.

As shown in these figures, the thermal-type airflow meter of the first embodiment is composed of airflow meter body 86, within which a main air passage 81 is formed, and a measuring part 87 having a measuring element positioned within the main air passage 81 to measure the flow rate of air flowing therethrough. Hereinafter, the measuring part 87 alone is sometimes called a thermal-type airflow meter, or simply an airflow meter.

The measuring part 87 includes heating resistor 1 for the flow rate measurement, thermistor 2 for the air temperature measurement, plural terminals 35 for supporting the heating resistor 1 and the thermistor 2, and circuit substrate 6 for an electronic circuit. The measuring part 87 further comprises housing 3, which has a compartment with openings on both sides thereof that accommodates therein the circuit substrate 6, and which fixedly holds the supporting terminals 35.

To the housing 3, there is attached a member 4 with a substantially U-shaped sub-air passage formed therein, one end of which is open. The heating resistor 1 and the thermistor 2 are positioned in the sub-air passage.

Furthermore, the measuring part 87 comprises metallic base 5, on which the circuit substrate 6 is provided, and which functions as a first covering member for covering both the opening on one side of the compartment in the housing 3 and the open end of the sub-air passage together. A second covering member 9 covers the opening on the other side of the space in the housing 3.

The housing 3 is a unitary body made of a molded plastic material. It includes a frame part 31 that forms the room which accommodates and protects the circuit substrate 6, a connector part 32 with terminal connectors 33 for providing the electric connection with external devices, a fixing part 34 for fixedly mounting the plural terminals 35 that supports the heating resistor 1 and the thermistor 2, and a mounting flange 36. The housing 3, and at least the frame part 31 thereof, is formed in a flat shape.

The thermistor 2 is a resistor which senses the temperature of the intake air. Using this information, the difference between the temperature of the heating resistor 1 and that of the intake air is controlled to be kept constant.

The heating resistor 1 and the thermistor 2 are welded to the supporting terminals 35. The housing 3 is a plastic-molded article, in which terminals and others are planted in advance, and therefore there exists no obstacle to electrodes for the welding and chucks for holding the resistor 1 or the thermistor 2 around the portion of welding the resistor 1 and the thermistor 2 to the terminals 35. Therefore, the workability in assembling is excellent.

To the housing 3, there is attached the subpassage member 4, which is also made by plastic-molding in a flat shape with a certain thickness, and is further grooved in a U-shape. As described later, the groove is covered by a metallic base member, so that a sub-air passage is formed in the subpassage member 4. The sub-air passage has an inlet opening 41, a first path 42, a bent portion 43, a second path 44 and an outlet opening 45.

The inlet opening 41 opens against the air flow. The first path 42 extends from the opening 41 along the air flow, in which the heating resistor 1 and others are accommodated. The second path 44 is arranged in parallel with the first path 42, but separated from the housing 3. The bent portion 43 is positioned at the end of the first path 42 opposite the inlet opening 41, and provides a substantially U-turn, whereby the first and second paths 42, 44 can communicate with each other. The outlet opening 45 is positioned at the end of path 44 which is opposite the juncture of the second path 44 and the bent portion 43, and opens almost adjacent the inlet opening 41 in the direction perpendicular to the plane of the inlet opening 41.

With this structure of the sub-air passage, in FIG. 1, air entering from the inlet opening 41 advances through the fist path 42, from left right in tne drawing, changes its direction in the bent portion 43 and advances through the second path 44, toward the left in the drawing. The thus turned air flow is discharged from the outlet opening 45 in the direction perpendicular to the plane of the drawing (toward the back, of the drawing in the case as shown).

As shown in FIG. 2, the subpassage member 4 is attached to the housing 3 at junction 51 and to the cover 9 at junction 52. When the subpassage member 4 is attached to the housing 3, a part of a metallic base member (described later) covers the groove made in the subpassage member 4 so that the sub-air passage as mentioned above is formed.

The metallic base 5 is manufactured out of steel plate by press punching, for example, to be in the form of a flat rectangle. The circuit substrate 6 is installed on the metallic base 5, and covers both the open side of the space of the housing 3 and a part of the groove formed in the subpassage member 4 together, so that the frame part 31 and the subpassage member 4, both being formed flat, are held next to each other.

Parts existing between the connector part 32 of the housing 3, on one side, and the subpassage member 4, on the opposite side, are arranged in a single plane, putting the frame part 31 of the housing 3 therebetween. In other words, at least the frame part 31 of the housing 3 and the subpassage member 4 are formed in a flat shape and fixedly arranged on the flat metallic base 5 in its longitudinal direction. Further, the metallic base 5 is provided with projections for connecting and grooves for positioning, which are used in order that the metallic base member 5 is coupled with the housing 3 and the subpassage member 4 to cover them.

Therefore, according to a feature of the thermal-type airflow meter according to the present invention the housing 3 and the subpassage member 4 are formed separately, and then adhered to each other to be arranged on the flat metallic base 5 which is mechanically strong in its longitudinal direction. Both the housing 3 and the subpassage member 4 are fixedly attached to the metallic base 5.

With the airflow meter constructed as above, since the housing 3 and the subpassage member 4 are prepared separately, thereof in their longitudinal dimension can be shortened, compared with the conventional airflow meter in which both members are initially formed in a single body. As a result, the initial change in the dimension of both members, which can occur during plastic-molding, is small. The initial change in the dimension of both members in the separate molding can be reduced to ¼ compared with that such a member which is molded as a single body.

Since the metallic base 5 has the necessary mechanical strength, it can be used as a support serving as a dimensional standard, when an airflow meter is assembled. This enables the accurate assembly of an airflow meter. Further, since the dimensions of metallic base 5 do not readily change with age, age variation of the dimension of the housing 3 and the subpassage member 4 fixedly attached to the metallic base 5, can be prevented. Accordingly, the influence of the dimensional change in an airflow meter on the measurement accuracy can be significantly reduced.

On the other hand, the cover 9 may be made out of plastic material or steel, and covers the other open side of the housing 3. Further, as described later, the cover 9 can be integrated with the subpassage member 4 and further with the metallic base 5. Therefore, the cover 9 can be constructed in a given manner. As shown in FIG. 2, the cover 9 can be coupled with the housing 3 and the subpassage member 4 by the connecting portion 52, such as positioning grooves, for example.

As shown in the figures and described above, each of the separately manufactured members, such as the housing 3, the subpassage member 4, the metallic base 5 and the cover 9, is constructed so as to have junctions by which it is coupled with two other members. In other words, according to a feature of the thermal-type airflow meter according to the present invention, each one of the housing, the sub-air passage and the metallic base member is fixed to another member so as to have common surfaces, on wnich iwo different members are coupled with each other.

With the structure as above, a member is fixed on two connecting surfaces of different members. Therefore, the frequency of separation or removal of the members is reduced. More preferably, there are provided (1) more than one connecting surface, or (2) two connecting surfaces having the directions different from each other (a horizontal connecting surface and a vertical one, for example).

The following describes an example of a process for assembling an airflow meter according to the invention.

First, the housing 3 and the subpassage member 4 are fixedly attached to the metallic base 5, on which the circuit substrate 6 is installed also. Then, the circuit substrate 6 and the connector terminals 33 as well as the supporting terminals 35 are electrically connected by conductive leads 7.

After that, the cover 9 is fixed to the housing 3 and the subpassage member 4. In this manner, the measuring part 87 is constructed as a module, in which a housing and a sub-air passage are integrated as one body (also referred to as a measuring module in the following).

On the other hand, the airflow meter body 86 is formed by a cylindrical member as a main element, which defines the main air passage 81. Insertion hole 83 is made in the wall of the cylindrical member, and attaching mount 82 is provided around the hole 83. Such an airflow meter body 86 can be manufactured by plastic-molding or by metal-casting.

To assemble the housing 3 and the subpassage member 4, for example, the measuring module 87, is inserted into the airflow meter body 86 through the insertion hole 83 such that the subpassage member 4 of the measuring module 87 is positioned in an appropriate area within the main air passage 81. The thus inserted measuring module 87 is held to the airflow meter body 86 by fixing the flange 36 of the housing 3 to the attaching mount 82 by screws 84.

As described above, a portion of the measuring module 87, which exists within the main air passage 81, (composed mainly of the frame part 31 of the housing 3 and the subpassage member 4) is formed in a flat shape, as shown in FIG. 2. Further, when the portion is sectioned perpendicularly to the inserting direction, the sectional form is substantially the same everywhere in the inserting direction as the form of the case which is formed by the frame part 31 of the housing 3, the metallic base 5 and the cover 9 to accommodate the circuit substrate 6.

Therefore, the measuring module 87 can be made the minimum size necessary for the circuit substrate 6. As a result, the insertion hole 83 to be bored in the airflow meter body 86 can be made as small as possible in accordance with the necessity. Therefore the width of the inserted module that is an obstacle to airflow within the main air passage 81 can be also made thin. Accordingly, an airflow meter which is compact and easy to lay out, and also has less flow resistance in a main air passage, can be realized.

That is to say, a thermal-type airflow meter according to the present invention is provided with a body member exclusively used for an airflow meter, in which a main air passage is formed. The body member has an insertion hole a fixing mount, through which a subpassage member and a part of a housing can be inserted. The subpassage member and the part of the housing are attached on a metallic base, which is inserted through the insertion hole in a plane which is parallel with the direction of air flow within the main air passage.

Further, the housing is fixed to the fixing mount of the body member such that the subpassage member is positioned thereinside (i.e., within the main air passage), and the connector part of the housing is positioned outside the body member.

In prior art airflow meters of this type there can be a considerable length from the connector part 32 one end at of the measuring module 87, to the subpassage member 4, as a terminal end (the other end) thereof. Since, however, the housing 3 and the subpassage member 4 according to the invention are made as separate plastic molded articles, the warp and distortion can be drastically reduced. Such warp and distortion had to be considered when the housing 3 and the subpassage member 4 are formed as a plastic-molded article of one body.

Since both are the housing 3 and subpassage member 4 attached to the metallic base 5 in the airflow meter according to the invention, the warp and distortion as mentioned above can be suppressed to a great extent. The dimensional error can also be reduced, when the two members are assembled. In particular, when the subpassage member 4 is attached to the housing 3, an error easily occurs in the attaching angle between both members, since the sectional form of both members sectioned perpendicularly to the inserting direction is thin. In general, therefore, it is difficult to assure that those two members are assembled as a straight structure, without a base member. This problem is solved by the present invention.

The housing 3 and the subpassage member 4 are made out of plastic material, which is easily deformed by changes of the environmental operating conditions, especially temperature. According to the present invention, however, since these elements are fixed on the metallic base 5, which is mechanically strong and not easily deformed by the temperature change, degradation of durability of an airflow meter can be prevented.

That is, because a housing and a subpassage member are manufactured separately, the initial dimensional change of both members, which occurs during molding, can minimized. Further, because both members are attached to a metallic base, aged dimensional change thereof can be also suppressed. As a result, the dimensional accuracy can be secured and therefore the influence of the dimensional change on the measuring accuracy of an airflow meter can be removed.

As apparent from the above description, the metallic base 5 is adhered to both the housing 3 and the subpassage member 4. The housing 3, on the other hand, is fixed not only to the metallic base 5, but also to the subpassage member 4 and the cover 9, while the subpassage member 4, is fixedly mounted to the metallic base 5, the housing 3 and the cover 9. Finally, the cover 9 is held to the housing 3 and the subpassage member 4.

In this manner, each member is always fixedly coupled to more than one other member, which other members are different from each other. Therefore, even if the adhesion between two members deteriorates (because of poor cleansing of adhering surfaces, inappropriate adhering work, etc.), separation or removal of the two members can be prevented, because each of those members is also fixed to at least one further member.

When a member is coupled to another one, the member has not only a common adhering surface to the another one, but also another common adhering surface to a third one. Since, therefore, a member is always fixedly coupled to more than one other member, the durability and reliability of an airflow meter is much improved.

Moreover, the measuring module 87 is constructed simply by stacking the housing 3, the subpassage member 4, the circuit substrate 6 and the cover 9 on the metallic base 5 in the order as enumerated. Therefore, the productivity in assembly of the airflow meter is excellent. In order to further reduce the number of parts, the subpassage member 4 and the cover 9 can be plastic-molded as one body, as described later.

The subpassage member 4 is formed in a U-shape in order to prevent the measuring accuracy from deteriorating due to pulsation in air flow, and to prevent the heating resistor 1 from suffering age deterioration due to contamination.

Another feature of a thermal-type airflow meter according to the present invention is that a subair passage is composed of a first path and a second path which are parallel with each other, with the first path extending along the plane in which heating resistor fixing mounts of a housing frame part are formed; and the second path is positioned in the same plane, apart from the housing with respect to the first path.

Further, one end of the first path opens perpendicularly to the plane, in which the heating resistor fixing mounts are formed, to form an inlet of a sub-air passage, and the other end is closed in the vertical direction and opens at the boundary of the second path, whereby the first path communicates with the second path.

The second path opens perpendicularly to the plane of the inlet opening of the sub-air passage at the end on the same side that the inlet of the sub-air passage in the first path is formed, whereby the outlet of the sub-air passage is formed. Accordingly, the sub-air passage is formed in an overall U-shape, between the inlet and the outlet.

In some cases, the portion of the sub-air passage at which a thermistor is positioned is made most narrow. Even in this case, however, the cross-sectional area can be freely determined, since the width of the sub-air passage varies by changing the depth of the groove in a shelllike article.

In this manner, according to the present invention, a sub-air passage, the shape of which is freely selected, can be plastic-molded as one body. Therefore, a sub-air passage is made in a most appropriate shape according to the variation of engine, only if a part of a sub-air passage is altered without any change in other parts.

That is to say, another feature of the present invention is that a portion of a metallic base member, which forms an inner wall of a sub-air passage, is made substantially flat, with a shell-like member which forms a sub-air passage having bottom surfaces at levels that are at different depths, and with the space between a surface which forms a metallic base member and a bottom surface of the shell-like member which forms a sub-air passage, the width of which varies.

In the following, description will be made of another embodiment of the present invention.

Figure 3:
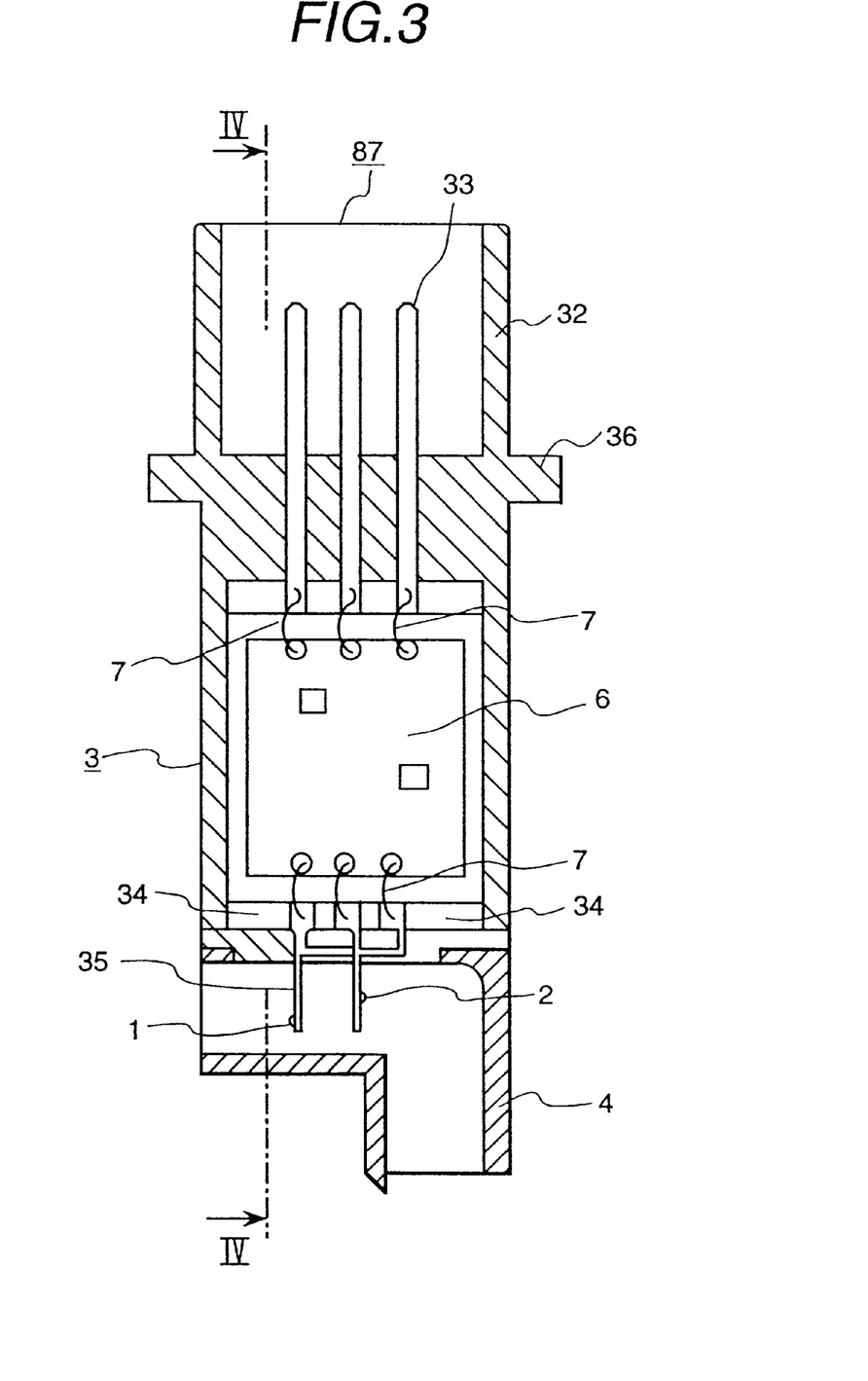
FIG. 3 schematically shows a sectional view of only a measuring part of a thermal-type airflow meter according to another embodiment of the present invention.
Figure 4:
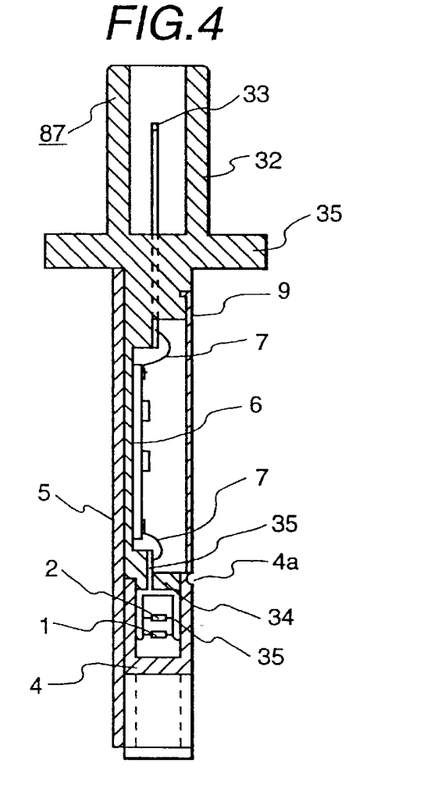
FIG. 4 shows a cross section of the measuring part, as shown in FIG. 3, along the line IV—IV.

Referring to FIGS. 3 and 4, a thermal-type airflow meter according to the another embodiment of the present invention will be described, wherein FIG. 3 schematically shows the sectional view of only a measuring module of an airflow meter, and FIG. 4 shows the cross section of the measuring module, as shown in FIG. 3, along the line IV—IV. Further, the measuring module as shown will be called an airflow meter in the description below.

The airflow meter of the second embodiment comprises housing 3 having a compartment, which has an opening on only one side thereof and accommodates therein the circuit substrate 6 as an electronic circuit. The housing 3 also fixedly holds the terminals 35 for supporting the heating resistor 1 and the thermistor 2. The airflow meter further comprises the subpassage member 4 with an L-shaped sub-air passage formed therein, in which the heating resistor 1 and the thermistor 2 are located. The metallic base 5 fixedly holds the housing 3 and the subpassage member 4, while the cover 9 covers the opening of the space in the housing 3 which accommodates the circuit substrate 6 therein.

The housing 3 is a plastic article molded as one body, in which there are included box-like body 31a protectingly accommodating the circuit substrate 6, the connector part 32 having the connector terminals 33 and the fixing parts 34 for firmly holding the supporting terminals 35. The circuit substrate 6 is attached to the bottom of the compartment in the box-like body 31a. The conductive leads 7 electrically connect the circuit substrate 6 with the connector terminals 33, as well as with the supporting terminals 35 provided with the heating resistor 1 and the thermistor 2 by welding.

The subpassage member 4 is a plastic article, in which an L-shaped sub-air passage with one right-angled bent portion is formed. Such an L-shaped sub-air passage can be manufactured as a single plastic-molded article. The housing 3 and the subpassage member 4 arranged next thereto are fixed on the metallic base 5, and the cover 9 is fixed to the housing 3, whereby the measuring module 87 of the airflow meter is formed.

The circuit substrate 6 is fixed to the housing 3 in this embodiment, not to the metallic base 5 as in the first embodiment. Further, the housing 3 and the whole of the subpassage member 4 are arranged on the metallic base 5, and the cover 9 is attached to the housing 3, whereby the measuring moduie 87 is integrated with the housing and the sub-air passage. Further, if the cover 9 is detachably attached to the housing 3, the circuit substrate 6 accommodated therein can be easily adjusted.

With this structure in which the housing 3 and the subpassage member 4 are fixed on the metallic base 5, the accuracy of the positional relationship therebetween can be improved. Further, since deformation due to temperature change is suppressed by the mechanically strong metallic base 5, durability of the airflow meter can be secured. Furthermore, also in this embodiment, since each member is always fixed to more than one other member, it is not easily removed or separated from another member. Therefore the durability and reliability of an airflow meter is much improved.

In this embodiment, as shown in FIG. 4, the subpassage member 4 and the cover 9 are integrated and plastic-molded in thin connecting portion 4a at the end of the subpassage member 4. With this structure, the number of parts can be reduced. Although details are not shown, a person ordinarily skilled in the art can easily integrate the metallic base 5 and the cover 9 for common use, that is to say, fixedly put the housing 3 and the subpassage member 4 on the single metallic base 5 and cover openings of the housing 3 and/or the subpassage member 4.

The features of the thermal-type airflow meter according to the present invention are summarized as follows:

(1) A frame member or a box-like body (called a frame member, hereinafter), having openings on both sides thereof, for protectingly accommodating an electronic circuit, a connector part and fixing parts of members for supporting a heating resistor and a thermistor are integrated and plastic-molded to form a housing member. The connector part and the fixing parts are installed on both opposite sides of the frame member, and a member (called a subpassage member, hereinafter), within which a sub-air passage is formed, is installed on the opposite side to the connector part;

(2) At least the frame member and the subpassage member are fixedly arranged in the same plane as a metallic base member;

(3) The subpassage member is formed as a shell-like plastic-molded article, and an opening of the shell-like article is covered by the metallic base member, whereby the sub-air passage is formed;

(4) One of the openings of the frame member and an opening of the subpassage member are both covered by the metallic base member;

(5) Another opening of the frame member is covered by a cover member; and (6) Each of the housing member, the subpassage member, the metallic base member and the cover member is fixedly connected to more than one other member.

The following describes a process for mounting the airflow meter as mentioned above.

Figure 5:
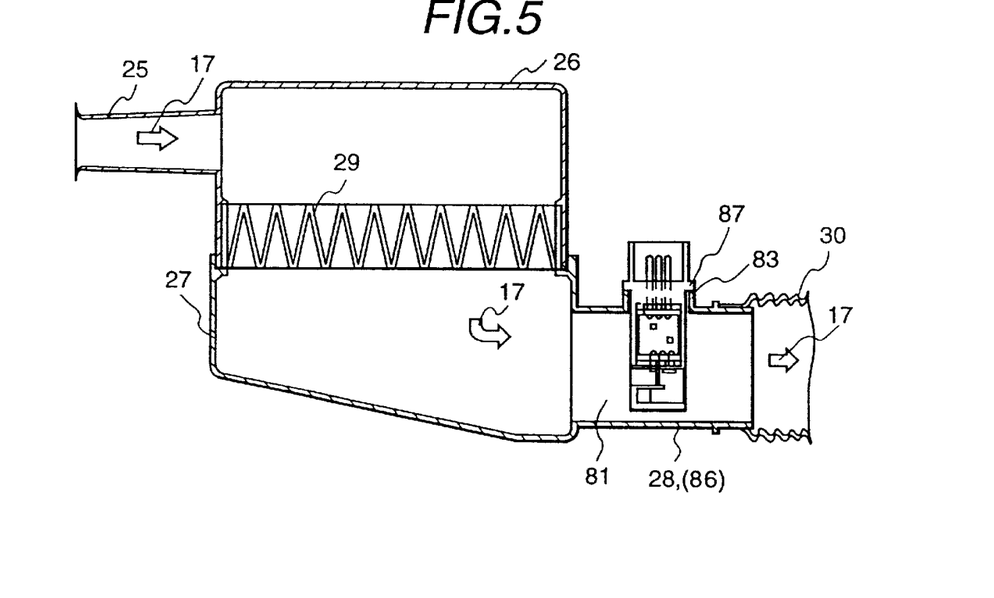
FIG. 5 schematically shows a sectional view of a part of an example, in which the thermal-type airflow meter according to the present invention is equipped on an internal combustion engine.

FIG. 5 schematically shows a partial sectional view of an example in which the thermal-type airflow meter according to the present invention is installed in an internal combustion engine. In this example, a part of an air cleaner installed in an engine compartment is used as an airflow meter body. Further, this figure shows an intake air system for an internal combustion engine equipped with the airflow meter according to the embodiment as shown in FIG. 1.

In the figure, the intake air system of an internal combustion engine has an air cleaner, an airflow meter and an intake air duct. The air cleaner comprises upstream-side case member 26 with introduction duct 25 for taking fresh air and downstream-side case member 27 with coupling duct 28, wherein the coupling duct 28 is used as a member corresponding to the airflow meter body 86 in the first embodiment. A filter 29 is fixed between both case members 26 and 27, for removing dust from air.

Fresh air is taken in, as shown by left-hand end arrow 17 in the figure, and accordingly clean air (from which dust is removed by the filter 29) flows through the coupling duct 28, as shown by right-hand end arrow 17.

The measuring module 87 is inserted into the duct 28 through an insertion hole 83 bored therein and is screwed to the duct 28.

In this manner, the duct 28, which is part of the air cleaner, can be used as the main air passage 81, so that a special airflow meter body is not needed. Accordingly, the measuring module 87 itself can be put on the market as a separate economical module of an airflow meter.

As described above, another feature of the airflow meter of the present invention is that, instead of the special airflow meter body 87, the fixing mount 82 and the insertion hole 83 are provided in a part of the intake air system (such as an air cleaner, a coupling duct, a throttle body, an intake manifold and so on), and the measuring module 87 is attached, so that an airflow meter is integrated as a part of an intake air system.

Thus, in an intake air system, to which an airflow meter of the present invention is applied, a part of the intake air system, enumerated as above, is provided with the fixing mount 82 and the insertion hole 83, by means of which a thermal-type airflow meter of the present invention is attached.

Figure 6:
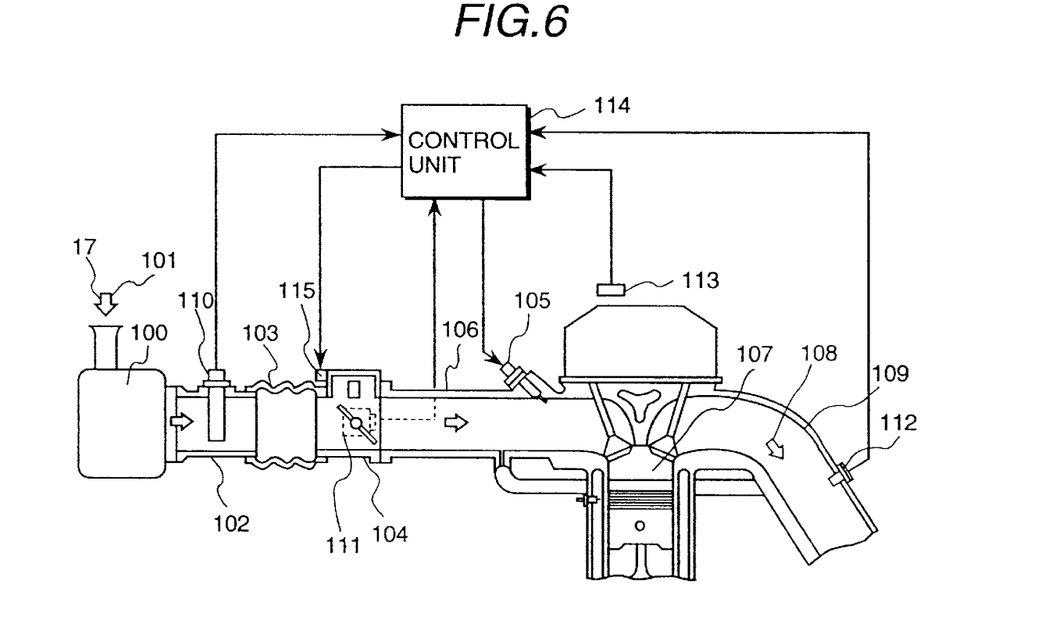
FIG. 6 schematically shows an electronic-controlled fuel injection control system for an internal combustion engine, in which the airflow meter according to the present invention is used.

In the following, description will be made of an electronic-controlled fuel injection control system for an internal combustion engine, in which the airflow meter according to the present invention is used. FIG. 6 schematically shows such control system.

In the figure, intake air 101 taken by air cleaner 100 is led to engine cylinder 107 through a part of body 102 of the air cleaner, duct 103, throttle body 104 and manifold 106 with fuel injector 105. On the other hand, exhaust gas 108 from the engine cylinder 107 is discharged through exhaust manifold 109.

Control unit 114 is supplied with an air flow rate signal generated from an airflow meter module 110, a throttle valve opening signal produced by throttle angle sensor 111, an oxygen signal generated by oxygen sensor 112 equipped in the exhaust manifold 109, and a rotational speed signal produced by engine rotation sensor 113. Receiving those signals, the control unit 114 carries out a predetermined calculation to determine an appropriate amount of fuel to be injected and an opening of an idle air control valve. Based thereon, the injector 105 and the idle air control valve 115 are controlled. With this, the electronic fuel injection control for an internal combustion engine can be carried out by using the airflow meter.

According to the present invention, an airflow meter which has excellent dimensional accuracy, is less subject to degradation in its durability, and is compact in its structure, can be easily manufactured, even if it has a sub-air passage with a complicated figure, such as U-shaped, as shown in FIGS. 1 and 2. Accordingly, it becomes possible to provide an airflow meter, which is excellent in its accuracy and durability and easy in its installation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An assembly for a thermal airflow meter, said assembly comprising:
   a sub-air passage adapted to be installed in a main air passage of a thermal type air flow meter, and having at least one bent portion for conveying a part of air flowing through the main air passage;
   a heating resistor arranged within the sub-air passage; and
   an electronic circuit electrically connected to the heating resistor and producing a signal according to an airflow rate on the basis of heat radiated by the heating resistor, wherein
      a housing, which protectingly accommodates therein the electronic circuit, is composed of a frame part surrounding the electronic circuit, a connector part with connector terminals for electrically coupling the electronic circuit with external devices, and fixing mounts for fixedly supporting the heating resistor on a side opposite the connector part with respect to the frame part, all of which are plastic-molded as one body;
      a sub-air passage member for forming the sub-air passage is a plastic-molded article; and
      at least the frame part of the housing and the sub-air passage member are formed in a flat shape and fixedly arranged on a metallic base member in a longitudinal direction thereof, so as to locate the heating resistor in the sub-air passage.

2. The assembly according to claim 1, wherein said main air passage is connected in fluid communication with an intake air passage for an internal combustion engine.

3. The assembly according to claim 1, further comprising:
   a cover member which covers a side of the metallic base member opposite to the frame part, the cover member being fixed both to the housing member and to the sub-air passage member, whereby the frame part is covered by the metallic base member on one side and by the cover member on the opposite side, thereby forming a closed compartment for accommodating therein the electronic circuit.

4. The assembly according to claim 1, wherein the sub air passage member comprises a molded shell member with an opening on one side thereof, which opening is covered by the metallic base member to form the sub-air passage when the shell member is fixed to the metallic base member.

5. The assembly according to claim 3, wherein the sub air passage member comprises a molded shell member with an opening on one side thereof, which opening is covered by the metallic base member to form the sub-air passage when the shell member is fixed to the metallic base member.

6. The thermal airflow meter according to claim 3, wherein the sub-air passage member and the cover are integrated as one body.

7. An assembly for a thermal airflow meter, said assemble comprising:
   a sub-air passage having at least one bent portion for conveying a part of air flowing through a main air passage;
   a heating sensitive sensor arranged within the sub-air passage and coupled to an electronic circuit for producing a signal indicative of an airflow rate in said sub-air passage; and
   a housing accommodating therein the electronic circuit, said housing being composed of a frame part surrounding the electronic circuit, a connector part with connector terminals for electrically coupling the electronic circuit with external devices, and fixing mounts for fixedly supporting the heat sensitive sensor on a side opposite the connector part with respect to the frame part, all of which are plastic-molded as one body; wherein
      a sub-air passage member for forming the sub-air passage is a plastic-molded article; and
      at least the frame part of the housing and the sub-air passage member are formed in a flat shape and fixedly arranged on a metallic base member in a longitudinal direction thereof, so as to locate the heat sensitive sensor in the sub-air passage.

8. The assembly according to claim 7, wherein said main air passage is connected in fluid communication with an intake air passage for an internal combustion engine.

9. The assembly according to claim 7, further comprising:
   a cover member which covers a side of the metallic base member opposite to the frame part, the cover member being fixed both to the housing member and to the sub-air passage member, whereby the frame part is covered by the metallic base member on one side and by the cover member on the opposite side, thereby forming a closed compartment for accommodating therein the electronic circuit.

10. The assembly according to claim 7, wherein the sub air passage member comprises a molded shell member with an opening on one side thereof, which opening is covered by the metallic base member to form the sub-air passage when the shell member is fixed to the metallic base member.

11. The assembly according to claim 9, wherein the sub air passage member comprises a molded shell member with an opening on one side thereof, which opening is covered by the metallic base member to form the sub-air passage when the shell member is fixed to the metallic base member.

12. The thermal airflow meter according to claim 9, wherein the sub-air passage member and the cover are integrated as one body.

13. An assembly for a thermal airflow meter, said assembly comprising:
   a sub-air passage having at least one bent portion for conveying an air flow therein;
   a heat sensor arranged within the sub-air passage and coupled to an electronic circuit which generates a signal indicative of an airflow rate in said sub-air passage; and
   a housing comprising a frame part surrounding the electronic circuit, a connector part with connector terminals for electrically coupling the electronic circuit with external devices, and fixing mounts for fixedly supporting the heat sensor on a side opposite the connector part with respect to the frame part, all of which are plastic-molded as one body; wherein a sub-air passage member for forming the sub-air passage is a plastic-molded article; and at least the frame part of the housing and the sub-air passage member are formed in a flat shape and fixedly arranged on a metallic base member in a longitudinal direction thereof, so as to locate the heat sensor in the sub-air passage.

14. The assembly according to claim 13, further comprising:

a cover member which covers a side of the metallic base member opposite to the frame part, the cover member being fixed both to the housing member and to the sub-air passage member, whereby the frame part is covered by the metallic base member on one side and by the cover member on the opposite side, thereby forming a closed compartment for accommodating therein the electronic circuit.

15. The assembly according to claim 13, wherein the sub air passage member comprises a molded shell member with an opening on one side thereof, which opening is covered by the metallic base member to form the sub-air passage when the shell member is fixed to the metallic base member.

16. The assembly according to claim 14, wherein the sub air passage member comprises a molded shell member with an opening on one side thereof, which opening is covered by the metallic base member to form the sub-air passage when the shell member is fixed to the metallic base member.

17. The thermal-type airflow meter according to claim 14, wherein the sub-air passage member and the cover are integrated as one body.

* * * * *